No. 734,233. PATENTED JULY 21, 1903.
C. P. A. KJÆRSGAARD.
SAFETY LAMP.
APPLICATION FILED OCT. 7, 1901.
NO MODEL.

Witnesses: Inventor:
Christian Peter Almue Kjærsgaard
by George Massie
his Attorneys No. 734,233.                                      Patented July 21, 1903.

UNITED STATES PATENT OFFICE.

CHRISTEN PETER ALRUM KJÆRSGAARD, OF AARHUS, DENMARK.

SAFETY-LAMP.

SPECIFICATION forming part of Letters Patent No. 734,233, dated July 21, 1903.

Application filed October 7, 1901. Serial No. 77,862. (No model.)

*To all whom it may concern:*

Be it known that I, CHRISTEN PETER ALRUM KJÆRSGAARD, manufacturer, of Aarhus, in the Kingdom of Denmark, have invented certain new and useful Improvements in Safety-Lamps Which are Automatically Extinguished When They Overset, (for which I have applied for patents in Denmark on the 7th of March, 1901, No. 280; in Germany on the 13th of March, 1901, No. 20,960; in Denmark on the 8th of August, 1901, No. 954, and in Germany on the 13th of August, 1901, No. 21,756,) of which the following is a specification.

This invention relates to a lamp which is automatically extinguished when it overturns and in which an overheating of the oil-reservoir and consequent explosion is prevented, for which reason the lamp is especially adapted for use in stable-lanterns or the like.

Figure 1:
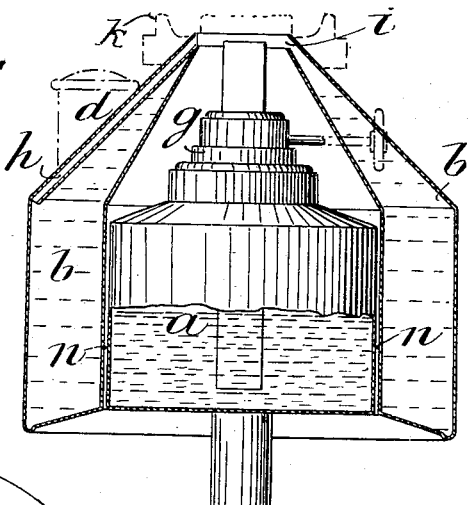
Figure 2:
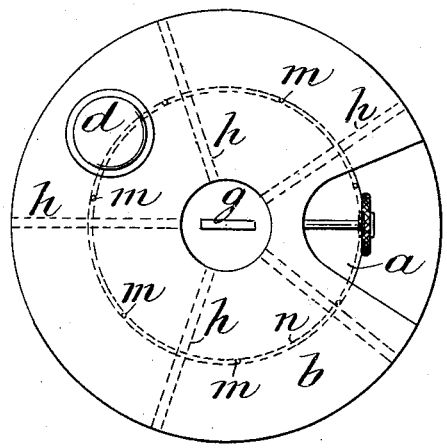

According to this invention the oil-reservoir is surrounded by a second reservoir containing water or another fire-extinguishing fluid, which second reservoir in the form of construction shown in Figures 1 and 2 has an upper extension having the shape of a double-walled funnel surrounding the burner and with its annular upper opening directly opposite the flame or the upper end at the wick. In the funnel is a number of tubes open in both their ends and fixed to the outer wall of the funnel and having their upper ends in line with the upper end of the funnel, which tubes serve as vents for the admission of air to the reservoir. If the lamp overturns, at least one of said tubes will come in such a position that it can supply air to the water-reservoir, and thereby permit the water to escape in sufficient quantity for extinguishing the lamp.

Figure 3:
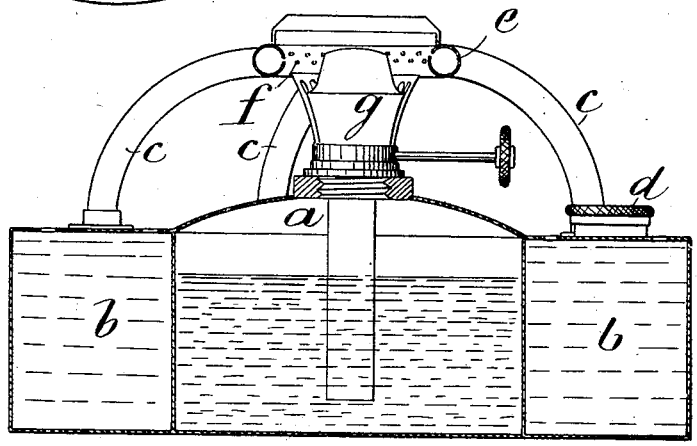

In the modification shown in Fig. 3 the water-reservoir is provided with two or more curved tubes having openings in vicinity to and surrounding the upper end of the wick-tube. If the lamp overturns, it will be automatically extinguished by the water flowing out through the curved tubes. If preferred, all the curved tubes can issue into a hollow (tube-shaped) ring surrounding the upper end of the wick-tube, said ring having its inner wall perforated in such a manner that the fire-extinguishing fluid, if the lamp overturns, will flow out through the holes and automatically extinguish the flame.

In the accompanying drawings, Fig. 1 shows in sectional elevation one form of a lamp constructed in accordance with the invention. Fig. 2 is a plan of Fig. 1, and Fig. 3 a sectional elevation of a modification.

The oil-reservoir $a$, Figs. 1 and 2, is surrounded by a water-reservoir $b$, having an upper funnel-shaped extension surrounding the burner $g$. The upper annular opening $i$ of the funnel is situated directly opposite the flame. In the funnel is provided a number of (say five) air-tubes $h$, open at both ends, and situated at equal intervals along the outer wall of the funnel. If the lamp overturns, one of said air-tubes will always be in such a position that it can supply air to the reservoir $b$, so that the water will be forced out in an even constant stream in sufficient quantity and extinguish the flame.

In the modification shown in Fig. 3 $a$ is the oil-reservoir surrounded by the second reservoir $b$, containing water or another fire-extinguishing fluid. The reservoir $b$ has an opening $d$, closed by a plug or cover, through which opening the water or other fluid can be introduced. The reservoir $b$ is provided with two or more curved tubes $c$, having outlets near around the upper end of the wick-tube $g$ or, preferably, as shown, in a tube-shaped or hollow ring $e$, surrounding the upper end of the wick-tube. The inner wall of the ring $e$ is provided with holes $f$, through which the fluid contained in the reservoir $b$ can flow out and extinguish the flame if the lamp overturns. The upper wall or cover of the reservoir $b$ may be provided with fine openings through which the air can enter and permit the escape of the water when the lamp overturns. The water-reservoir $b$ has not only a fire-extinguishing action, but it will also act as a cooler, cooling the oil-reservoir, thereby preventing explosions due to an overheating of the oil-reservoir. Such overheating of the oil-reservoir is absolutely prevented if the flame-spreader $k$, as shown in Fig. 1, is attached to the upper end of the funnel-shaped extension of the water-reservoir $b$, in which case the heat, which the flame-spreader receives from the flame, is not transferred directly to the oil-reservoir, but is absorbed by the water-reservoir and its contents, whereby an overheating of the oil and, of course, explosions are prevented.

In Figs. 1 and 2 is also shown an annular air-channel $n$ between the oil-reservoir $a$ and the water-reservoir $b$, through which air entering through holes $m$ in the bottom of the channel is supplied to the flame. The air-currents passing said channel $n$ will also assist in keeping the oil-reservoir cool.

Having now particularly described and ascertained the nature of my said invention and in what manner the same is to be performed, I declare that what I claim is—

1. In a lamp, the combination, with the burner, of a reservoir for an extinguishing liquid having outlets directed toward the burner, and air-inlets arranged in proximity to the outlets, and communicating with the interior of the reservoir near the side walls thereof.

2. In a lamp, the combination, with a burner, of a reservoir for extinguishing fluid having outlets directed toward the burner and air-tubes extending from a point in proximity to the outlet into the interior of the reservoir near the side wall thereof.

3. In a lamp, the combination, with a burner, of a reservoir for extinguishing liquid, having outlets directed toward the burner, and air-inlets arranged in proximity to the outlets and disposed at intervals about the wall of the reservoir.

4. In a lamp, the combination, with a reservoir for extinguishing liquid, having an outlet directed toward the burner, of air-tubes extending into the reservoir to a point near the side walls thereof and arranged around the reservoir at suitable intervals.

5. In a lamp, the combination with a burner, of a reservoir for non-combustible matter having outlets arranged in proximity to the burner, and air-inlets arranged in proximity thereto in such manner that when the lamp is overturned the interior end of the inlet-tube will be at a greater height than the outer end of the same.

6. In a lamp, the combination, with a burner, of a reservoir for extinguishing liquid having an outlet in proximity to the burner and provided with tubes arranged in proximity thereto, and extending into the reservoir in line with the burner and terminating at a point near the side wall of the reservoir.

7. In a lamp, the combination, with a lamp-reservoir and the burner, of a reservoir for extinguishing liquid surrounding and out of contact with the parts of the burner above the wick-tube, being mounted upon the reservoir for the extinguishing liquid, whereby the heat of the burner is conveyed to the reservoir for the extinguishing liquid and away from the oil-reservoir.

8. In a lamp, the combination, with the oil-reservoir and the wick-tube of the burner mounted thereon, of a reservoir for extinguishing liquid surrounding and insulated from the oil-reservoir and having the upper portion of the lamp-burner mounted thereon, whereby the heat of the burner is conveyed to the reservoir for the extinguishing liquid and away from the oil-reservoir.

9. In a lamp, the combination, of an oil-reservoir and the burner mounted thereon, with the reservoir for extinguishing liquid surrounding the same and an air-channel extending between the two reservoirs.

10. In a lamp, the combination, of an oil-reservoir and the burner mounted thereon, of a separate reservoir for extinguishing liquid surrounding the oil-reservoir, an air-channel being provided between the oil-reservoir and the reservoir for the extinguishing liquid.

11. In a lamp, the combination with the burner of a reservoir adapted to contain a fire-extinguishing substance, a hollow distributing-ring arranged about the burner and provided with outlets directed toward the burner, and passages communicating between the reservoir and the interior of the distributing-ring.

In witness whereof I have hereunto set my hand in presence of two witnesses.

CHRISTEN PETER ALRUM KJÆRSGAARD.

Witnesses:
MARCUON LALLIES,
MAGNÜS JENSEN.